Figures 1, 1A:
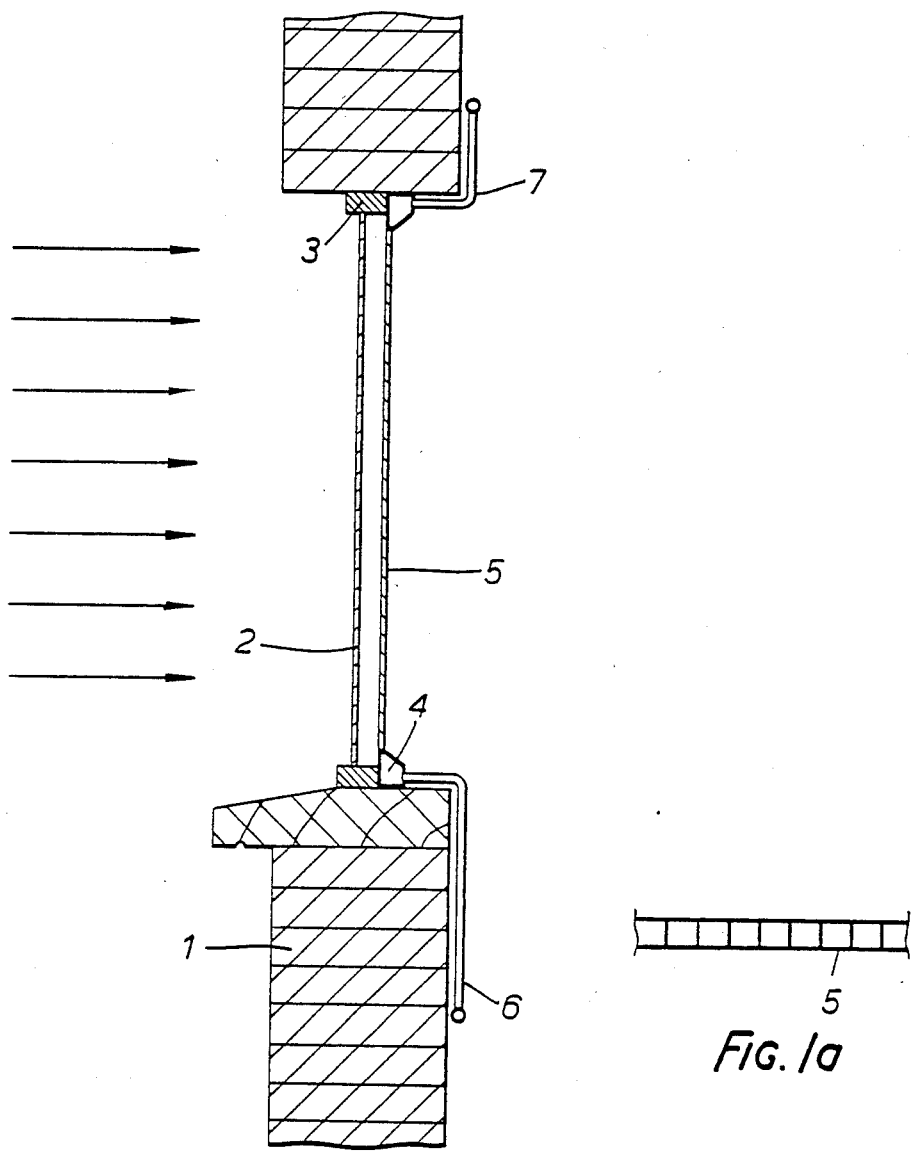

United States Patent [19]

McKee

[11] Patent Number: 4,561,221
[45] Date of Patent: Dec. 31, 1985

[54] WINDOWS

[76] Inventor: Frederick B. McKee, "Orcades" Mill Rd., Burnham-on-Crouch, Essex, England

[21] Appl. No.: 503,151
[22] PCT Filed: Sep. 17, 1981
[86] PCT No.: PCT/GB82/00273
§ 371 Date: May 17, 1983
§ 102(e) Date: May 17, 1983
[87] PCT Pub. No.: WO83/01103
PCT Pub. Date: Mar. 31, 1983

[30] Foreign Application Priority Data

Sep. 17, 1981 [GB] United Kingdom ............ 8128190

[51] Int. Cl.$^4$ .................... F24J 3/02; E06B 9/24
[52] U.S. Cl. .................... 52/171; 126/422; 126/436
[58] Field of Search .............. 52/171; 126/422, 436

[56] References Cited

U.S. PATENT DOCUMENTS

| 3,107,052 | 10/1963 | Garrison | 126/436 |
| 4,020,989 | 5/1977 | Kautz | 126/436 |
| 4,044,519 | 8/1977 | Morin et al. | 52/171 X |
| 4,169,460 | 10/1979 | Popovich et al. | 126/422 |
| 4,380,994 | 4/1983 | Seemann | 52/171 |

FOREIGN PATENT DOCUMENTS

| 0022389 | 1/1981 | European Pat. Off. . |
| 2637914 | 3/1978 | Fed. Rep. of Germany . |
| 2736137 | 5/1979 | Fed. Rep. of Germany . |
| 2851513 | 6/1980 | Fed. Rep. of Germany . |
| 2907042 | 9/1980 | Fed. Rep. of Germany ........ 52/171 |
| 2007664 | 1/1970 | France ................ 52/171 |
| 1328576 | 8/1973 | United Kingdom ......... 52/171 |

Primary Examiner—J. Karl Bell
Attorney, Agent, or Firm—Young & Thompson

[57] ABSTRACT

In order to achieve dissipation of heat from large areas of glazing in buildings in which solar radiation is directly incident, three are provided opposed glazing members as in an extruded panel (5) through which a heat exchange liquid flows in a closed circuit to dissipate its heat at a location remote from the window. The heat exchange liquid is colored in such manner as to allow solar radiation incident on the front glazing member to pass through the heat exchange liquid so that its infrared component is at least partially absorbed and the colorings of the heat exchange liquid and of the glazing members are such that light is able to pass therethrough into the room provided with the glazing.

12 Claims, 3 Drawing Figures

WINDOWS

This invention relates to windows and in particular to windows of large surface area in relation to rooms which they serve.

It is increasingly common practice in building construction, especially in construction of large business and commercial premises, to employ windows of large surface area in relation to the rooms or other spaces to which they are intended to introduce external natural light. In many buildings, these windows are not capable of opening, the buildings being served by air conditioning systems. Particularly with high rise buildings which are exposed to a greater amount of solar radiation, it is the practice to reduce glare within the buildings by employing a tinted or a reflective glazing in order to minimize the amount of light passing therethrough. Both forms of glazing are not very popular with persons inside the building, especially the reflective glazing which indeed is a source of nuisance to people outside the building; indeed reflective types of glazing while controlling solar radiation input, reflects solar energy onto north facing sides of adjacent buildings in the northern hemisphere (south facing in the southern hemisphere). With tinted glass, there is the significant disadvantage that whilst the light may be cut out, infrared radiation is not; it is absorbed by the glass and long wavelength radiant thermal energy is reemitted into a room fitted with the window and can still lead to considerable heating up to an extent which air conditioning may be unable to cope with, especially if, as a result of the use of partitioning, the space within the building does not benefit from the air conditioning to the same extent at all locations. Otherwise particularly powerful air conditioning systems are needed. There is also the risk that, because of the darkening of the glass, some heat will be absorbed by the glass to a greater extent and with colourless glass, unless the glass is correctly mounted, there is a risk of greater expansion and possible cracking thereof as a result of thermal stress.

It is an object of the invention to provide a form of glazing which is effective in reducing insulation in buildings without having the aforementioned disadvantages.

According to the present invention, there is provided, in or for use in a building, a glazing system including glazing which comprises a front glazing member on which solar radiation is to be incident, which glazing member is transparent or translucent, and a rear glazing member opposed to said glazing member and which is likewise transparent or translucent, which glazing members define therebetween at least one passage for throughflow of a liiquid as part of a duct means comprised by or to be installed with the glazing members and comprising appropriate components for forming a closed circuit passing externally of the glazing members for passage of a heat exchange liquid and dissipation of absorbed solar energy at a position external of the glazing members, the colouring of the heat exchange liquid being such that solar radiation incident on the front glazing member is able to pass through the heat exchange liquid whereby its infrared component is at least partially absorbed thereby and light is able to pass therethrough in accordance with the optical densities of the heat exchange liquid and the materials from which the front and rear glazing members are made.

By employing a cooling system passing through the glazing system, it is intended to remove from the glazing and thereby prevent from affecting the temperature in the room a major proportion of the thermal energy which would otherwise work to raise the temperature within the room. One or both of the front and rear glazing members may be made of a darkened material thereby to reduce the amount of glare within the room. It is also possible for the heat exchange liquid to be coloured. This will have the advantage of enabling the maximum amount of thermal energy to be absorbed directly by the heat exchange liquid and removed from the glazing members. If a darkened heat exchange liquid is employed, then use of darkened glazing material becomes optional and may even need to be avoided if an adequate amount of light is to reach the room served by the glazing. Indeed a coloured heat exchange liquid has the advantage of being selectable in accordance with architectural requirements. Moreover the colour (and even colour concentration) can be varied for psychological reasons, that is bluish in summer to suggest cooling and reddish in winter to suggest warming. Alternatively, if indeed a colourless heat exchange liquid, usually water, is employed with a darkened glazing, then it should be borne in mind that even a so-called colourless liquid possesses some opacity to ultra-violet and infrared radiation of suitable wavelengths and this will result in significant heating of the heat exchange liquid. The term "colouring" is used herein to denote both the addition of colouring material to the heat exchange liquid and the absence of any such additive.

It should be noted that the invention is indeed not limited to the use of darkened glazing and/or darkened heat exchange liquid. In some cases the absorptive character of normal water may be used in combination with normal colourless glass. It is envisaged that such usage could be employed with an external sunshade of a type which will block out light and nevertheless allow transmission of infrared radiation. Such usage of the glazing system according to the invention might not then be so much with large scale industrial or commercial buildings, but more on a domestic scale. Nevertheless, it could provide for useful heating of water and again passage through the closed circuit as a heat exchange liquid.

Although in principle the front and rear glazing members of a glazing system according to the invention may simply be opposed panels of glass or plastics material as in double glazing, such an arrangement will not allow a particularly convenient flow of heat exchange liquid to be achieved. Apart from the question of the existence of air bubbles of varying size, there is the problem of header constuctions to the glazing and also the much greater risk of leakages. Accordingly, it is preferred to employ, to provide the front and rear wall members and ducting therebetween for heat exchange liquid, a panel, generally being formed of synthetic plastics material having opposed wall members and a plurality of channels therethrough disposed preferably vertically, usually for upward flow of heat exchange fluid, but alternatively possibly horizontally between header means for supply to and removal from the panel of heat exchange liquid. The panel is preferably an extrudate formed from a plurality of channels extending lengthwise thereof. For example, the panel may be formed of polycarbonate or of polypropylene and may have the extruded structure of a packaging material available in the United Kingdom from Corruplast Limited under their registered trademark "Correx". With such a structure, substantially the entire cross-section of the panel is made up of channel interiors which may be supplied with heat exchange liquid from header means. This panel may take the place of conventional windows completely, but in most cases it is expected that it will be placed behind a normal type window, that is on the room side. The panel will thus form a type of secondary double glazing.

Insofar as it may be considered that the walls separating the individual channels will serve to obscure vision out of the window, it is possible to select heat exchange liquids which possess refractive indices matched to the refractive index of the plastics material from which the panel is made so that a generally clear and uninterrupted view may be obtained through the glazing while the heat exchange liquid is therein.

The construction of the glazing system externally of the glazing members will depend upon the manner in which the absorbed solar radiation is to be dissipated. The absorbed energy may be dissipated in a wide variety of generally useful ways. In the simplest case, it can be dissipated to the atmosphere by heat exchange with air blown into a room or dissipated at a location where heating up of the atmosphere is of no consequence, for which receives little insolation through generally being in the shade. However of greater value is the utilisation of the heat by heat transfer in an indirect heat exchange with water to be heated at a position remote from the glazing members. Such water can be for supply to the hot water system of the building or alternatively may form part of a central heating system in the building. In this latter case, use can be made of the considerable amounts of thermal radiation incident at particular locations of a building in accordance with the position of the sun to heat such locations or other locations in the building, while parts of the building not receiving such heating are provided with auxiliary heating in accordance with the time of year and general atmospheric temperature. It is estimated that for a large office building many megawatt hours per year of normally wasted solar energy may be utilised leading to savings which may be reckoned in terms of thousands or hundreds of thousands of barrels of oil.

The thermal energy need not only be dissipated as heat. Should the heat exchange liquid be of a thermally activatable fluorescent or luminescent character then the absorbed radiation may be employed to activate the light emitting character of the fluid which may be utilised at a location remote from the window for illumination purposes. Such illumination may be employed at locations where a low level of lighting is required such as in underground car parks, tunnels etc. At any location where the fluid reaches a transparent wall member, illumination will occur. This may be thus a transparent tube section or a flat panel section.

The luminescent or fluorescent fluid may also be stored in containers to retain the luminosity so that in the night time when irradiation of the fluid by solar radiation is not occurring, the pumping system associated with the glazing can operate to extract the liquid from the store and provide for example a low level of security illumination within the building.

Moreover, when employing a luminescent or fluorescent liquid, the pump employed for circulation through the overall glazing system may have a valve attached to it so that two different fluids can be passed along the ducting alternately. This will give a moving dotted line effect which would be very useful in indicating directions in which people are supposed to be travelling. The two liquids do not necessarily have to be different liquids; they may be the same luminescent or fluorescent fluid but in two different states of activity.

The luminescent or fluorescent liquid does not necessarily have to be a true solution. A luminescent or fluorescent chemical may be contained in a micro balloon. In fact very small quantities of solid luminescent materials may be carried by means of any suitable base liquid through the duct system associated with the glazing.

When the heat exchange liquid is rendered dark to enhance the absorption of thermal radiation, it may even be rendered black, but obviously not to an extent such as to prevent passage of light therethrough. Under no circumstances must the heat exchange liquid be rendered completely opaque since then there will be the problem that thermal radiation will also only be capable of absorption at surface molecular layers of the heat exchange liquid where local overheating may occur affecting the front wall surface of the heat collector structure. The heat exchange liquid, when darkened, may therefore be water which may be rendered dark by the presence of colloidal materials such as graphite suspended therein. Alternatively, carbon black of suitable size for it to remain in suspension may be employed in the heat exchange liquid. A particularly useful combination has been found to be the combination of suspended colloidal graphite together with a dark dye, for example a dark green dye dissolved in the heat exchange liquid.

Figure 2:
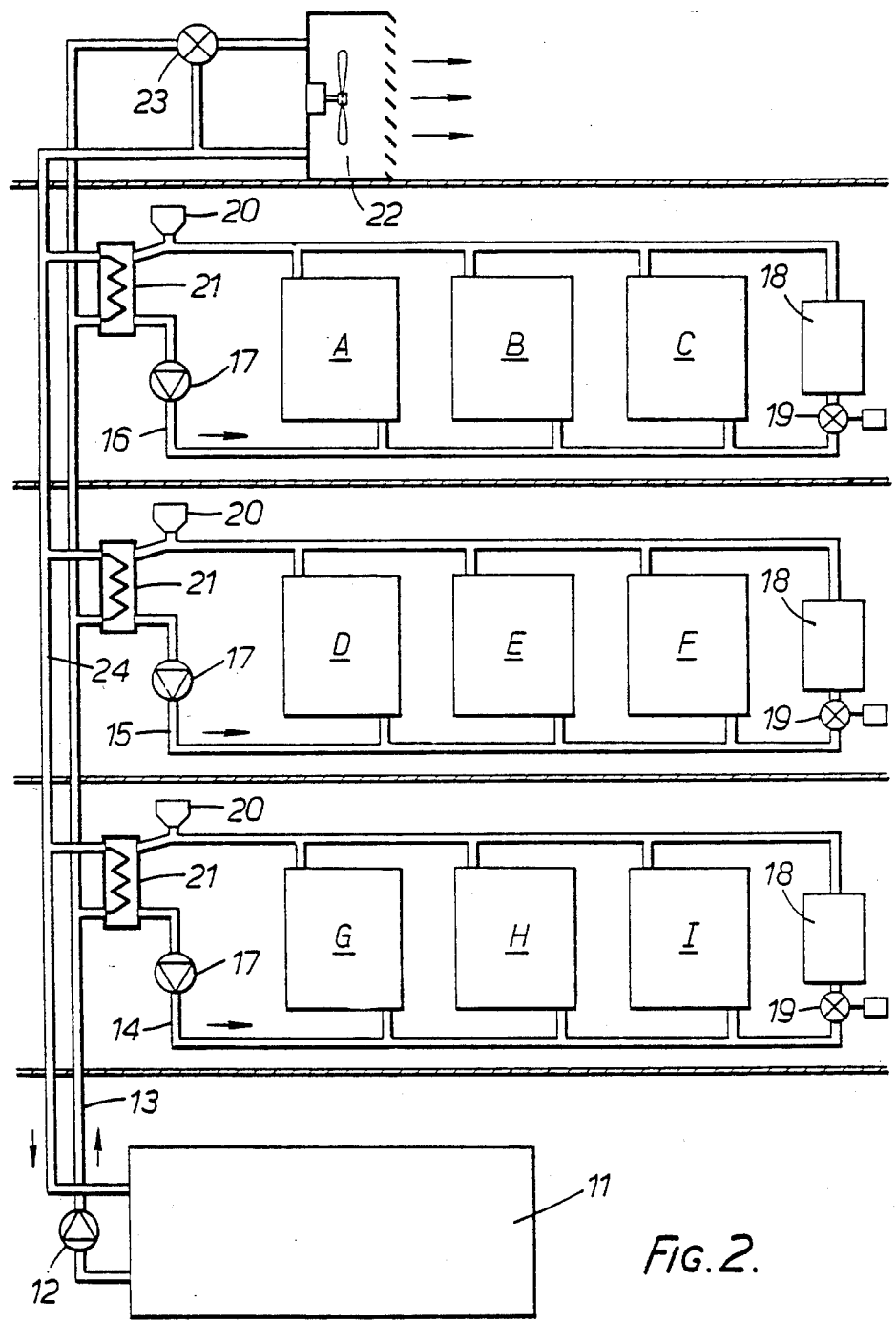

For a better understanding of the invention and to show how the same may be carried into effect reference will now be made by way of example only to the accompanying drawings wherein:

FIG. 1 shows in vertical cross-section a window of a glazing system according to the invention; and FIG. 1a is a cross-sectional view through the window shown in FIG. 1; and FIG. 2 shows diagrammatically an arrangement for achieving essential heat dissipation from a glazing system according to the invention.

Referring to FIG. 1, there is installed in masonry 1 existing glazing 2 within frame 3. On the room interior side of the frame 3 is a frame 4 of a solar window 5 formed of extruded plastics material having channels extending lengthwise thereof (although not shown extending vertically in the assembled window). The frame 4 provides header means for supply of heat exchange fluid through an inlet duct 6 and removal of heat exchange fluid through a duct 7. Adjoining FIG. 1 is FIG. 1a showing a section through the window 5, indicating the manner of formation of the channels.

FIG. 2 shows a series of solar windows A to I as might be present in one wall of an office building. The windows form part of a flow system which comprises a storage tank 11 which may be in the basement or the roof of a building, a pump 12, a supply duct 13 having branches 14, 15 and 16 to the respective floors of the building each branch including an auxiliary pump 17. Associated with the circuit at the level of any one floor is a low temperature space heater 18 having a thermo valve 19, an expansion tank 20 and heat exchanger 21. Not all of the thermal content of the flowing liquid will have been removed at the space heaters and heat exchanger and accordingly at roof level there is provided a fan driven excess heat dissipator 22. A three way valve 23 is available in case it is not required to use the heat dissipator. A duct 24 serves for return of heat exchange fluid to the tank 11.

I claim:

1. For use in a building, a glazing system including glazing which comprises a front glazing member on which solar radiation is to be incident during use thereof, which glazing member is transparent or translucent, and a rear glazing member opposed to said front glazing member and which is likewise transparent or translucent, which glazing members are comprised by a panel having opposed wall members and header means for throughflow of a liquid as part of duct means comprised by or to be installed with said panel and comprising appropriate components for forming a closed circuit passing externally of the glazing member for passage of a heat exchange liquid and dissipation of absorbed solar radiation at a location external of the glazing members, the colouring of the heat exchange liquid being such that solar radiation incident on the front glazing member is able to pass through the heat exchange liquid whereby its infrared component is at least partially absorbed thereby and light is able to pass therethrough in accordance with the optical densities of the heat exchange liquid and the materials from which the front and rear glazing members are made, and said panel comprising a plurality of separator walls which define between the pair of opposed wall members a plurality of elongate channels extending in side-by-side relationship between the wall members and each connected at their respective ends with said header means.

2. A system as claimed in claim 1, wherein the panel is formed of polycarbonate plastics material.

3. A system as claimed in claim 1 which additionally comprises heat exchanger means externally of said glazing members for dissipation of the heat content of the heat exchange fluid to achieve heating of air or of water in a hot water system or a central heating system.

4. A building comprising a combined glazing system and closed circuit containing heat exchange fluid, the glazing system including glazing which comprises a front glazing member on which solar radiation is to be incident during use thereof, which glazing member is transparent or translucent, and a rear glazing member opposed to said front glazing member which is likewise transparent or translucent, which glazing members are comprised by a panel having opposed wall members and header means for throughflow of a liquid, said panel forming part of sad closed circuit which passes externally of the glazing member for dissipation of solar radiation absorbed by the liquid which has passed between the glazing members, the colouring of the exchange liquid being such that solar radiation incident on the front glazing member is able to pass through the heat exchange liquid whereby its infrared component is at least partially absorbed thereby and light is able to pass therethrough in accordance with the optical densities of the heat exchange liquid and the materials from which the front and rear glazing members are made, and said panel comprising a plurality of separator walls which define between the pair of opposed wall members a plurality of elongate channels extending in side-by-side relationship between the wall members and which each connect at their respective ends with said heater means.

5. A building as claimed in claim 4, wherein the refractive indices of the material from which the panel is made and of the heat exchange liquid are substantially identical.

6. A building as claimed in claim 4, wherein the panel is formed of polycarbonate plastics material.

7. A building as claimed in claim 4, wherein the closed circuit passes through heat exchanger means externally of said glazing members for dissipation of the heat content of the heat exchange fluid to achieve heating of air or water in a hot water system or a central heating system.

8. A building as claimed in claim 4, wherein the heat exchange liquid is rendered dark to enhance the absorption of thermal radiation therein but not sufficiently opaque as to prevent passage of visible light through into the building.

9. A building as claimed in claim 4, wherein the heat exchange fluid contains a fluorescent or luminescent pigment or dye therein which is thermally actuable and the closed circuit comprises a section external to the glazing at which the luminescence imparted to the fluid may be viewed and illumination thereby achieved.

10. A building as claimed in claim 9, wherein the heat exchange liquid comprises suspended therein micro balloons having a luminescent or fluorescent substance optionally in solid form.

11. For use in a building, a glazing system including glazing which comprises a front glazing member on which solar radiation is to be incident during use thereof, which glazing member is transparent or translucent, and a rear glazing member opposed to said front glazing member and which is likewise transparent or translucent, which glazing members are comprised by a panel having opposed wall members and header means for throughflow of a liquid as part of duct means comprised by or to be installed with the glazing members and comprising appropriate components for forming a closed circuit passing externally of the glazing member for passage of a heat exchange liquid and dissipation of absorbed solar radiation at a location external of the glazing members, the colouring of the heat exchange liquid being such that solar radiation incident on the front glazing member is able to pass through the heat exchange liquid whereby its infrared component is at least partially absorbed thereby and light is able to pass therethrough in accordance with the optical densities of the heat exchange liquid and the materials from which the front and rear glazing members are made, said panel comprising a plurality of separator walls which maintain said opposed wall members interconnected but spaced apart in a predetermined relationship, and said separator walls defining between the pair of opposed wall members a plurality of parallel elongate channels which extend in side-by-side relationship between the wall members and which each connect at their respective ends with said header means.

12. A system as claimed in claim 11 wherein said separator walls are formed from a transparent or translucent material the same as that from which the opposed wall members are formed.

* * * * *